United States Patent [19]

Cocito

[11] Patent Number: 4,728,350
[45] Date of Patent: Mar. 1, 1988

[54] PROCESS AND APPARATUS FOR PRODUCING OPTICAL-FIBER PREFORMS FOR MID-INFRARED RANGE FIBERS

[75] Inventor: Giuseppe Cocito, Turin, Italy

[73] Assignee: Cselt-Centro Studi e Laboratori Telecommunicazioni S.p.A., Turin, Italy

[21] Appl. No.: 30,777

[22] Filed: Mar. 25, 1987

[30] Foreign Application Priority Data

Apr. 10, 1986 [IT] Italy ............................ 67290 A/86

[51] Int. Cl.$^4$ .......................................... C03B 37/018
[52] U.S. Cl. ...................................... 65/3.11; 65/3.12; 65/DIG. 16; 65/11.1; 350/96.34; 427/163
[58] Field of Search .................. 65/3.11, 3.12, 18.2, 65/DIG. 16, 11.1; 427/163; 350/96.34

[56] References Cited

U.S. PATENT DOCUMENTS

| | | | |
|---|---|---|---|
| 3,971,645 | 7/1976 | Bachmann et al. | 65/3.12 |
| 4,253,863 | 3/1981 | Iyengar | 65/3.12 X |
| 4,278,459 | 7/1981 | Partus | 65/3.12 X |
| 4,597,787 | 7/1986 | Jacobson | 65/3.12 |
| 4,610,708 | 9/1986 | Sarhangi et al. | 65/DIG. 16 |
| 4,666,247 | 5/1987 | MacChesney et al. | 350/96.34 |
| 4,666,486 | 5/1987 | Hutta | 65/DIG. 16 |

FOREIGN PATENT DOCUMENTS 8701110 8/1986 Int'l Pat. Institute ............... 65/3.12

OTHER PUBLICATIONS

Michael A. Soderstrand, *Active R Ladders:* . . . IEEE Transactions . . . , Dec. 1978.
Okoshi et al, *Computation of Bit-Error Rate* . . . Journal of Opt. Comm., 1981.
Tran et al., *Fluoride Glass Preforms* . . . , Electronics Letters, Jul. 1982.
Miyashita et al., *Infrared Optical Fibers*, IEEE Journal of Quant. El., Oct. 1982.
David W. Smith, *Coherent Fiberoptic Communications*, Laser Focus . . . , Nov. 1985.

*Primary Examiner*—Robert L. Lindsay
*Attorney, Agent, or Firm*—Karl F. Ross; Herbert Dubno

[57] ABSTRACT

The process employs solid-state halides heated at high temperature, under pressure conditions necessary to their vaporization, and obtains their condensation to a solid state on the internal surface of a glass tube, which, after collapsing, forms the preform.

20 Claims, 1 Drawing Figure

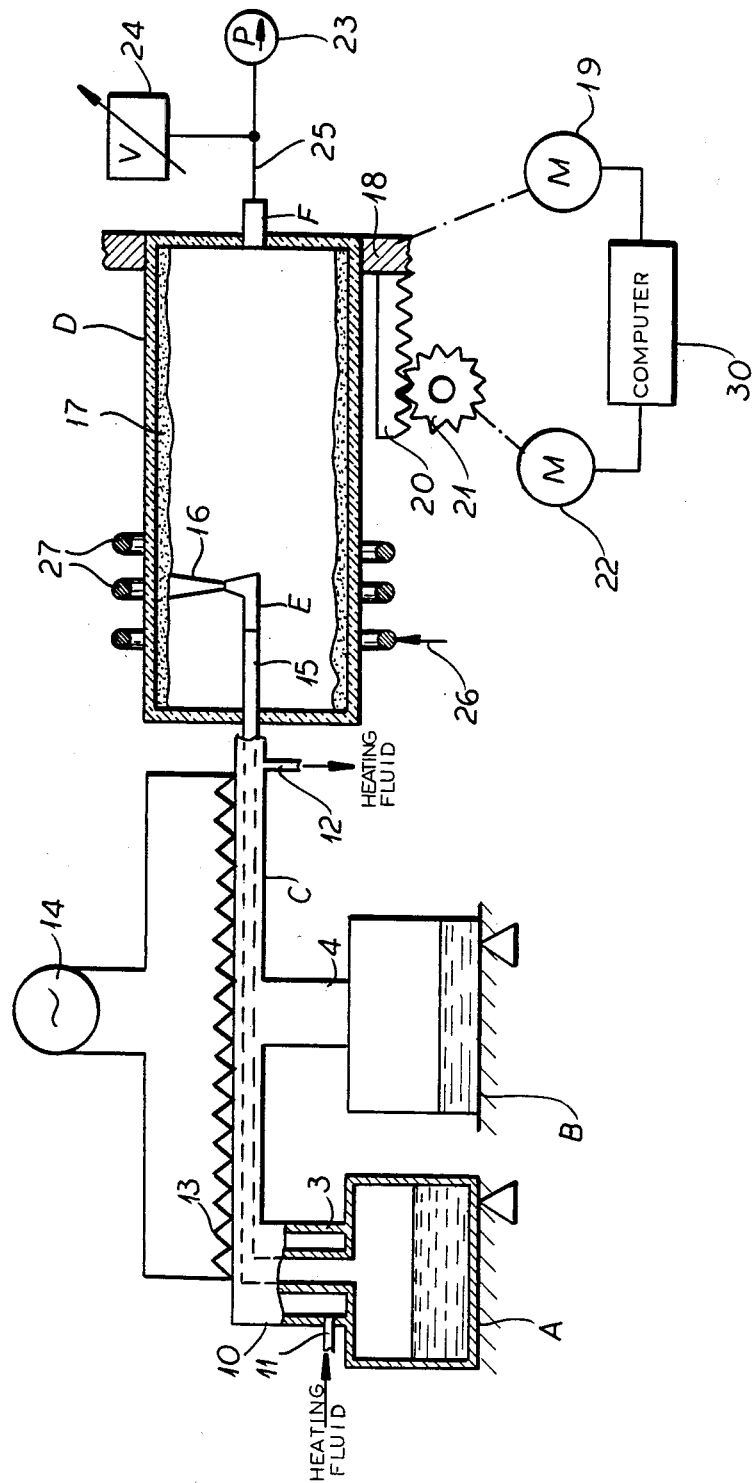

PROCESS AND APPARATUS FOR PRODUCING OPTICAL-FIBER PREFORMS FOR MID-INFRARED RANGE FIBERS

FIELD OF THE INVENTION

My present invention relates to the manufacturing of transparent material for optical devices and, more particularly, to a process and an apparatus for the fabrication of optical-fiber preforms and optical fibers drawn from such preforms for operation in the mid-infrared spectral range.

BACKGROUND OF THE INVENTION

Halides, chalcogenides and heavy-metal oxides are considered as the most promising materials for manufacturing extremely low-loss glasses for the transmission of light radiations at wavelengths ranging from 2 to 12 $\mu$m.

More particularly, attenuation values of the order of $10^{-4}$ dB/km are theoretically attainable so that optical transmission systems with trunk lengths of several thousand kms without intermediate repeaters may be implemented.

A method of fabricating halide-based optical-fiber preforms and, more particularly, fluoride-based preforms, has been described in a papers entitled "Infrared Optical Fibers" by Tadashi Myashita and alia", *IEEE Journal of Ouantum Electronics*, Vol. QE-18, No. 10, October 1982.

According to this method, named "build-in casting", the material is heated and, once it reaches a low degree of viscosity, is poured into a cylindrical vessel. When the desired-thickness layer for the cladding fabrication solidifies in contact with the cold wall of the vessel, the still liquid axial portion is poured off and replaced by a material suited to core fabrication. After solidification, the vessel is removed and the resultant preform is then drawn.

An alternative process, intended to eliminate the conicity of the preform obtained according to this earlier technique, is described in "Fluoride Glass Preforms Prepared by a Rotational Casting Process" by D. C. Tran et al, *Electronics Letters*, 22 July 1982, Vol. 18, No. 15. The vessel into which the fluoride based material is poured for the fabrication of the cladding, is rotated around its axis, so as to obtain a constant-thickness layer by centrifugal force. Then the process is the same as that previously described.

However, these methods have a number of disadvantages, making it impossible to reach the above-mentioned theoretical attenuation limits. Some losses arise which are dependent on local discontinuities at the surfaces of contact between core and cladding, formed at successive time periods. Between these surfaces, impurities of various natures, such as powders and gases, are trapped and localized crystallization can result giving rise to scattering attenuations.

The preform also cannot be very large, since the enclosed region at controlled temperature, necessary to limit the pollution must be able to contain the vessel-rotating apparatus, furnaces, handling apparatus, glass-fabricating apparatus, etc.

As a consequence of the limitation in preform size, the fiber trunks produced cannot be very long in spite of the fact that the low attenuation attainable by these methods could be expected to allow the fabrication of fiber with lengths of several hundreds of kms.

Repeated raw material handlings introduce further unavoidable contaminations even when they involve the most sophisticated methods.

Finally, graded reflective-index fibers are difficult to obtain.

OBJECTS OF THE INVENTION

The principal object of the invention is to provide an improved method of and apparatus for producing optical preforms from which optical fibers can be drawn which are effective in the mid-infrared range, whereby the above-mentioned drawbacks can be obviated, Another object of my present invention is to provide a process and an apparatus for fabricating optical fiber preforms from which ultra-low-loss optical fibers can be drawn to form fiber trunks which have length limits far less than those of earlier fibers.

Yet another object of the invention is to provide a process for producing such optical preforms for the fabrication of unlimited-length optical fibers which can have refractive index profiles varying as desired, both radially and circularly.

SUMMARY OF THE INVENTION

The present invention provides a process for manufacturing optical-fiber preforms from which optical fibers can be drawn for operation in the mid-infrared spectral range, using solid-state halides as raw materials. According to the invention, the halides are heated at high temperatures under controlled pressure so as to facilitate their passage to the aeriform or gaseous state, then they are introduced by conduits kept at the same high temperature into a cooled tube and sent towards its wall where they directly condense to solid state, the tube being subsequently deprived of non-halide-based portions.

Advantageously, different percentages of said aeriform-state halides are obtained in the solid state in the cooled tube by varying both the temperature at which they are heated, and their free surfaces.

An apparatus for carrying out the process can comprise at least two or more vessels for the solid-state halides heated at high temperature, a conduit connected to the vessels and heated to at least the highest of the temperatures, a nozzle at the end of this conduit, a glass tube into which the conduit extends axially and in which the pressure can be controlled through tubular fitting and an air pump, the tube being airtight and with cooled walls and being provided with means enabling it to be rotated around its axis and translated parallel to the same axis.

Advantageously, the tube is of oxide-based glass and its inner surface is clad with a layer of very stable halides, e.g. $CeF_3$, $EuF_2$, $HoF_3$, $MgF_2$.

Alternatively, the tube can be composed of halide-based glass.

Preferably, the conduit is double-walled and in the space between the walls, a high-temperature fluid is circulated.

In addition or alternatively, the conduit can comprise in or on its walls a resistive electric conductor adapted to generate heat by the passage of electrical current through the conductor.

The conduit can be composed of good heat-conducting material and is heated at one end.

The nozzle can direct the halides towards the wall of the tube uniformly or selectively in one or more directions.

BRIEF DESCRIPTION OF THE DRAWING

The above and other objects, features and advantages of the present invention will become more readily apparent from the following description, reference being made to the accompanying highly schematic drawing in which the sole FIGURE is a diagram having parts in section of an apparatus for carrying out the invention.

SPECIFIC DESCRIPTION AND EXAMPLE

The apparatus shown in the drawing comprises a pair of vessels A and B for the halides to be evaporated (see the details of the Example below) and heated by means represented at 1 and 2, respectively.

The vapors pass through branches 3 and 4 of the conduit C which is of the double-wall type and can be provided with a jacket 10 to which a heating fluid can be circulated via fittings 11 and 12. A molten metal, e.g. molten sodium, can be used as the heating fluid.

Additional heating, if necessary, can be supplied by an electrical heating element 13 built into a wall of the conduit C and energized by the electric-power source 14.

The tube D can be surrounded by a cooling coil 27 through which a cooling fluid, e.g. water, is circulated as represented at 26 and the deposit of condensed and immediately solidified halide from the jet 16 directed by the nozzle E at the end of the conduit D against the inner wall of the tube D can form the solid body of the preform formed by the deposit and the outer glass tube. The preform is collapsed and drawn into the optical fiber in the usual manner.

Holder 18 can support the glass tube D and can be coupled to a motor 19 for rotating the glass tube D about its axis to distribute the deposit. Another motor 22, also illustrated highly diagrammatically, is seen to drive a pinion 21 meshing with a rack 20 for axially reciprocating the glass tube D. Both of these latter means can be under the control of a computer/microprocessor 30 to allow variation in the deposit in the radial and circumferential directions to establish refractive index gradients which ultimately will appear in the drawn optical fiber.

The pressure in the tube D can be controlled by a pump 23 connected by pipe 25 to the fitting F. The process of the invention is used, in the present example, for manufacturing a fluoride-based optical-fiber preform. More particularly, a glass matrix with a mixture of CsF and $BeF_2$ is fabricated presenting a glass forming region with a variable ratio of the two ranging between 0 and 40% in weight of CsF.

The latter compound boils at 844° C. at a pressure of 10 mm Hg, while $BeF_2$ sublimates at 800° C. at atmospheric pressure.

The preform is fabricated with the apparatus shown in the drawing.

Both powder fluorides are placed in vessels A and B, confluent into conduit C, and raised to temperatures higher than the corresponding sublimation or boiling temperatures. To this end, suitable gas or electric furnaces are provided, surrounding the vessels themselves. Vapor obtained is sent by conduit C to tube D, being directed onto the internal wall thereof where the deposition is carried out.

To keep in the aeriform state the materials flowing into conduit C, C is heated to a temperature greater than or equal to the highest temperature of those of the vessels A and B. To this end conduit C can be provided with the double wall and in the interwall space, a fluid at high temperature can be circulated. As an alternative, a resistive electrical conductor is wound on the walls and a current is passed therethrough at a value to produce the necessary heat quantity. The conduit can also be made with a good heat-conducting material, heated outside of tube D.

At the end of conduit C a nozzle E is fixed, for directing the vapor jet towards the wall of tube D uniformly and according to one or more preferential directions.

Tube D is cooled with the external cooler, so as to make the vapor arriving at the tube wall condenses directly into the solid-state and fluoride-mixture deposit.

Besides tube D is axially displaced and possibly rotated to obtain a uniform deposition on the whole internal surface. A suitable joint ensures that an airtightness between conduit C and tube D and the air pump connected to the pipe fitting F allows the desired pressure to be attained within the system, composed of vessels A and B, conduits C and tube D. The pump also evacuates residual vapor.

The tube D can be made of fluoride or oxide based glasses, but in case of oxide glasses the internal surface should be coated first with a very stable halide-based layer, so as to avoid pollution of materials forming the fiber core and cladding. To this end, $CeF_3$, $EuF_2$, $HoF_3$, $MgF_2$, or the like can be used, preferably deposited with the same method described here for the fiber-forming material.

$BeF_2$ and CsF percentages can be varied by acting on the vapor quantities produced in vessels A and B. For this purpose, both the respective temperatures and free surfaces of components can be varied by varying the vessel dimensions.

Once the deposition is finished, when the external portion of the preform is made of an oxide-based glass, it is removed by mechanical or chemical methods.

Finally, either tube D is collapsed in a high-temperature furnace so as to obtain a rod, which is then drawn to produce the optical fiber, or the tube D can be directly drawn.

I claim:

1. A method of making an optical preform capable of being drawn into an optical fiber for operation in a mid-infrared spectral range, said method comprising the steps of:
   heating one or more halides to an elevated temperature at a controlled pressure to transform the halides to vapor and conducting vapors of the halides without condensation into the interior of a cooled tube;
   directing said vapors against an inner wall of said tube whereby said vapors directly condense on said wall to a solid state deposit; and
   removing nonhalide-based portions of said tube to yield said preform with at least said deposit being adapted to be drawn to form said optical fiber.

2. The method defined in claim 1 wherein said vapors are conducted into said tube through a conduit heated at least to the temperature of the highest temperature to which said halides are heated.

3. The method defined in claim 2 wherein said tube is composed of an oxide-based glass, further comprising the step of coating said wall with at least one stable halide selected from the group which consists of $CeF_3$, $EuF_2$, $HoF_3$, and $MgF_2$ before said deposit is formed.

4. The method defined in claim 3 wherein said oxide-based glass is removed before said preform is drawn to form the optical fiber.

5. The method defined in claim 1, further comprising the step of rotating said tube while said vapors are trained against said wall.

6. The method defined in claim 1, further comprising the step of axially reciprocating said tube while said vapors are trained against said wall.

7. The method defined in claim 1 wherein said tube is composed of a halide-based glass.

8. The method defined in claim 1 wherein said halides are CsF and $BeF_2$.

9. An apparatus for making an optical preform capable of being drawn into an optical fiber for operation in a mid-infrared spectral range, said apparatus comprising:
   means for heating one or more halides to an elevated temperature at a controlled pressure to transform the halides to vapor;
   a conduit connected to said means for heating for conducting vapors of the halides without condensation into the interior of a cooled tube; and
   a nozzle at an end of said conduit in said tube for directing said vapors against an inner wall of said tube whereby said vapors directly condense on said wall to a solid state deposit whereby by removing nonhalide-based portions of said tube said preform is obtained with at least said deposit being adapted to be drawn to form said optical fiber.

10. The apparatus defined in claim 9 wherein said means for heating comprises one or more vessels respectively containing said halides, heated to high temperature and connected to said conduit.

11. The apparatus defined in claim 10, further comprising means for heating said conduit to a temperature at least equal to the higher temperature of said vessels.

12. The apparatus defined in claim 11, further comprising:
   means for cooling said tube wall;
   means for rotating said tube relative to said nozzle;
   means for axially displacing said tube relative to said nozzle in translation parallel to an axis of said tube; and
   a pump connected to said tube for evacuating same.

13. The apparatus defined in claim 12 wherein said tube has a coating on said wall of at least one stable halide selected from the group which consists of $CeF_3$, $EuF_2$, $HoF_3$, and $MgF_2$ and is composed of an oxide-based glass.

14. The apparatus defined in claim 12 wherein said tube is composed of a halide-based glass.

15. The apparatus defined in claim 12 wherein said means for heating said conduit is a double-wall structure of said conduit and means for circulating a heating fluid through a space between walls thereof.

16. The apparatus defined in claim 12 wherein said means for heating said conduit is an electrical resistance heater extending along said conduit.

17. The apparatus defined in claim 12 wherein said conduit is composed of a material of high thermal conductivity and is heated by said means for heating only at one end of said conduit.

18. The apparatus defined in claim 12 wherein said nozzle is constructed and arranged to direct said vapors onto said wall uniformly.

19. The apparatus defined in claim 12 wherein said nozzle is constructed and arranged to direct said vapors against said wall selectively in a plurality of directions.

20. The apparatus defined in claim 12 wherein said vessels respectively contain CsF and $BF_2$.

* * * * *